US011457520B2

United States Patent
Matsumoto

(10) Patent No.: US 11,457,520 B2
(45) Date of Patent: Sep. 27, 2022

(54) LIGHTNING SUPPRESSION TYPE ARRESTER

(71) Applicant: LIGHTNING SUPPRESSION SYSTEMS CO., LTD., Kanagawa (JP)

(72) Inventor: Toshio Matsumoto, Kanagawa (JP)

(73) Assignee: LIGHTNING SUPPRESSION SYSTEMS CO., LTD., Kanagawa (JP)

( * ) Notice: Subject to any disclaimer, the term of this patent is extended or adjusted under 35 U.S.C. 154(b) by 282 days.

(21) Appl. No.: 16/760,860

(22) PCT Filed: Mar. 9, 2018

(86) PCT No.: PCT/JP2018/009350
§ 371 (c)(1),
(2) Date: Apr. 30, 2020

(87) PCT Pub. No.: WO2019/087423
PCT Pub. Date: May 9, 2019

(65) Prior Publication Data
US 2020/0352014 A1     Nov. 5, 2020

(30) Foreign Application Priority Data
Oct. 31, 2017   (JP) .............................. JP2017-211046

(51) Int. Cl.
*H05F 3/02*       (2006.01)

(52) U.S. Cl.
CPC ...................................... *H05F 3/02* (2013.01)

(58) Field of Classification Search
CPC .. H05F 3/02; H05F 3/04; F03D 80/30; H02G 13/80
(Continued)

(56) References Cited

U.S. PATENT DOCUMENTS

| 5,998,731 A * | 12/1999 | Takamura | .............. H02G 13/00 |
| | | | 174/6 |
| 6,828,895 B1 * | 12/2004 | Huo | ........................ H01H 39/00 |
| | | | 337/28 |

(Continued)

FOREIGN PATENT DOCUMENTS

| EP | 3570644 A1 | 11/2019 |
| JP | 10-189284 A | 7/1998 |

(Continued)

OTHER PUBLICATIONS

JP-2014-175298; Title: Grounding device; Publication Date: Sep. 22, 2014; Inventor: Akagi Masaharu; Figures and entire specification (Year: 2014).*

(Continued)

*Primary Examiner* — Dharti H Patel
(74) *Attorney, Agent, or Firm* — Calfee Halter & Griswold LLP

(57) ABSTRACT

Provided is a lightning suppression type arrester that can easily increase a quantity of negative charges required for lightning suppression while simplifying workability associated with installation as much as possible. A lightning suppression type arrester for suppressing lightning on a structure includes a charged body made of a conductive material provided in an electrically insulated state on a top of the structure, a first electrode body including a capacitor electrically connected to the charged body, the capacitor being installed on a ground and electrically connected to the ground, and a second electrode body opposed to the first electrode body via an electrical insulating layer to store an electric charge by a capacitance between the first electrode body and the second electrode body, in which the second electrode body is electrically connected to the charged body.

20 Claims, 2 Drawing Sheets

(58) Field of Classification Search
USPC .................................................. 361/117, 220
See application file for complete search history.

(56) References Cited

U.S. PATENT DOCUMENTS

| | | | |
|---|---|---|---|
| 2003/0067731 A1* | 4/2003 | Kent | ...................... H02G 13/60 361/118 |
| 2010/0007321 A1* | 1/2010 | Ogram | ...................... H05F 7/00 361/111 |

FOREIGN PATENT DOCUMENTS

| | | |
|---|---|---|
| JP | 3088727 U | 9/2002 |
| JP | 2007-42918 A | 2/2007 |
| JP | 5839331 B1 | 1/2016 |
| JP | 2016217340 A | 12/2016 |

OTHER PUBLICATIONS

English Translation of ISR from PCT/JP2018/009350 dated Jun. 5, 2018 (1 page).
Extended European Research Report from EP 18873698 dated Oct. 29, 2020 (8 pages).

* cited by examiner

LIGHTNING SUPPRESSION TYPE ARRESTER

CROSS-REFERENCE TO RELATED APPLICATIONS

This application is a 371 of PCT Application No. PCT/JP2018/009350 filed on Mar. 9, 2018, which claims priority to Japanese Application No. 2017-211046, filed on Oct. 31, 2017, the contents of which are hereby incorporated by reference as if recited in their entirety.

TECHNICAL FIELD

The present invention relates to a lightning suppression type arrester for protecting a protected object such as a structure or equipment from lightning damage by suppressing lightning.

BACKGROUND ART

Lightning is a discharge phenomenon that occurs in the atmosphere. Lightning discharges include intra-cloud discharge, inter-cloud discharge, and cloud-to-ground discharge. Of lightning discharges, cloud-to-ground discharge (hereinafter lightning) causes heavy damage. Lightning is a phenomenon that occurs when the electric field strength between a thundercloud (cloud base) and the ground or a structure built on the ground becomes extremely large, and an electric charge thereof becomes saturated to destroy the insulation of the atmosphere.

A close look at the phenomenon of lightning shows that, in the case of general lightning in summer (summer lightning), as the thundercloud matures, a stepped leader approaches the ground from the thundercloud while selecting a place where the atmosphere is easily discharged.

When the stepped leader is at a certain distance from the ground, an upward streamer (greeting discharge) of a weak current extends from the ground, a building (lightning rod), a tree, etc. toward the stepped leader.

When the streamer and the stepped leader are combined, a large current (feedback current) flows between the thundercloud and the ground through a path thereof.

This phenomenon is the lightning phenomenon.

With respect to such a lightning phenomenon, most of conventional lightning protection concepts correspond to a scheme in which a lightning strike is received by a rod-type lightning rod (Franklin rod) and sent to the ground from a viewpoint that lightning may not be prevented.

On the other hand, the present inventors have proposed a lightning suppression type arrester disclosed in Patent Document 1 to protect a protected object by minimizing the occurrence of lightning.

This lightning suppression type arrester has an upper electrode body and a lower electrode body disposed with an insulator interposed therebetween, and is configured by grounding only the lower electrode body.

Further, for example, when a thundercloud in which a negative charge is distributed on the cloud base approaches, an opposite charge (positive charge) is distributed on the surface of the ground, and a positive charge is collected on the grounded lower electrode body.

Then, the upper electrode body disposed via the insulator is negatively charged by an action of a capacitor.

By this action, generation of an upward streamer in and around the arrester is made less likely to occur to suppress the occurrence of lightning.

CITATION LIST

Patent Document

Patent Document 1: JP 5839331 B1

SUMMARY OF THE INVENTION

Problem to be Solved by the Invention

According to the above-mentioned proposal by the present inventors, lightning can be suppressed in a circular protection region centered on the arrester.

However, to effectively form the above-mentioned protection region, the arrester needs to be installed as a new facility on a top of the protected object.

In addition, to enhance the lightning suppression effect described above, it is necessary to increase a quantity of negative charges formed by the arrester.

To this end, the capacity of the capacitor of the arrester needs to be increased, and the arrester increases in size.

In addition, since the large arrester needs to be installed at a high place of the protected object, it is presumed that an installation operation becomes complicated.

The invention seeks to solve the problem remaining in the above-mentioned proposal, an object of the invention is to provide a lightning suppression type arrester that can easily increase the quantity of negative charges required for lightning suppression while simplifying high-place work associated with installation as much as possible to improve workability.

Means for Solving Problem

To solve the above-described problem, a lightning suppression type arrester of the invention is a lightning suppression type arrester for suppressing lightning on a structure comprising:

a charged body made of a conductive material provided in an electrically insulated state on a top of the structure;

a capacitor electrically connected to the charged body;

wherein the capacitor including: a first electrode body being installed on a ground and electrically connected to the ground; a second electrode body opposed to the first electrode body via an electrical insulating layer to store an electric charge by a capacitance between the first electrode body and the second electrode body, wherein the second electrode body is electrically connected to the charged body.

By adopting such a configuration, when a thundercloud in which a negative charge is distributed on the cloud base approaches, an opposite charge (positive charge) is distributed on the surface of the ground, and a positive charge is collected on the first electrode body of the capacitor grounded to the ground.

Then, the second electrode body opposed to the first electrode body via the electrical insulating layer is negatively charged by an action of the capacitor.

In addition, the charged body electrically connected to the second electrode body by the conductor is negatively charged.

Here, when the charged body is electrically insulated from the structure, a negative charge region is formed above the structure.

Therefore, generation of an upward streamer from the structure corresponding to the protected object rarely occurs, and lightning on the structure is suppressed.

Further, the capacitor which generates the negative charge is provided separately from the charged body, and thus can be installed on the ground near the structure.

Therefore, even when a large-capacity capacitor is used to increase the generated negative charges, this capacitor can be installed on the ground.

As a result, it is possible to simplify the installation operation of the lightning suppression type arrester.

Meanwhile, when the structure is a pagoda or a Buddhist temple, a jewel provided on a top thereof can be used as the charged body.

When the structure is a castle tower, a shachihoko provided on a top of the castle tower can be used as the charged body.

When the structure is a windmill, a receptacle provided at a blade tip of the windmill can be used as the charged body.

In addition, when the structure is a building or a house, a lightning rod provided in the building or the house can be used as the charged body.

As described above, when the jewel, the shachihoko, the receptacle, or the lightning rod is used as the charged body, it is possible to configure the lightning suppression type arrester using an existing structural skeleton.

In this way, it is possible to install the lightning suppression type arrester without a significant structural change of the structure.

It is possible to provide a plurality of capacitors. By adopting such a configuration, for example, it is possible to easily cope with a case in which the protected object is large and a large quantity of negative charges is required to suppress lightning.

In addition, the plurality of capacitors may include a first capacitor having a large capacitance and a second capacitor having a small capacitance.

By adopting such a configuration, when lightning having more energy than expected occurs and the lightning strikes the charged body, the lightning strike can be allowed to flow to the ground through a space between two electrode bodies of the second capacitor having the small capacitance.

In this way, it is possible to prevent the lightning strike from acting on the protected object, and prevent the damage.

The ground to which the capacitor is grounded is preferably higher than the surrounding ground. By raising the ground at the place where the capacitor is grounded, the capacitor can be protected from an influence of water, water damage, etc.

Effect of the Invention

According to the lightning suppression type arrester of the invention, it is possible to install a capacitor that generates a necessary quantity of negative charges for lightning suppression on the ground to simplify the installation operation accompanying the increase in size.

MODE(S) FOR CARRYING OUT THE INVENTION

Hereinafter, a first embodiment of the invention will be described with reference to FIG. 1.

Figure 1:
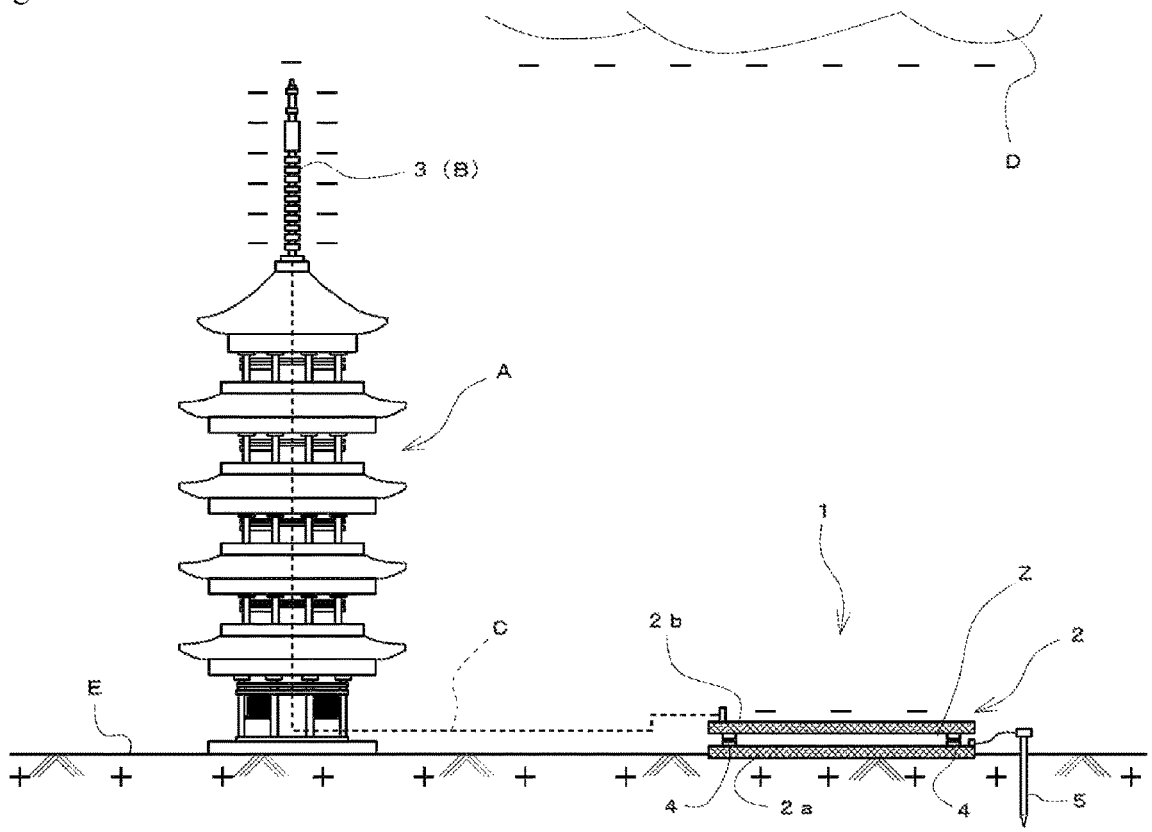
FIG. 1 is a front view schematically illustrating a first embodiment of the invention.

In FIG. 1, reference numeral 1 denotes a lightning suppression type arrester (hereinafter abbreviated as arrester) according to the present embodiment.

An arrester 1 of the present embodiment includes a charged body B made of a conductive material provided in an electrically insulated state on a top of a structure A, and a capacitor 2 electrically connected to the charged body B, the capacitor 2 includes a first electrode body 2a installed on a ground E and electrically connected to the ground E and a second electrode body 2b opposed to the first electrode body 2a via an electrical insulating layer Z to store an electric charge by a capacitance between the first electrode body 2a and the second electrode body 2b, and the second electrode body 2b is electrically connected to the charged body B by a cable C.

In the present embodiment, the structure A corresponds to a pagoda or a Buddhist temple, and a jewel 3 provided on a top of the pagoda or the Buddhist temple corresponds to the charged body B.

The first electrode body 2a included in the capacitor 2 is formed in a flat plate shape using a conductive material, and is laid on the ground E.

The second electrode body 2b included in the capacitor 2 is formed in a flat plate shape using a conductive material, and is opposed to the first electrode body 2a in parallel at a predetermined interval.

In addition, the first electrode body 2a and the second electrode body 2b are connected in a state of being electrically insulated by an insulator 4, and the electrical insulating layer Z is formed by a space formed between these opposing surfaces.

Further, one end of the cable C is electrically connected to a lower end of the jewel 3 as the charged body B and routed near the ground via the inside of the structure A, and the other end thereof is electrically connected to the second electrode body 2b.

Further, the first electrode body 2a is electrically connected to a ground rod 5 driven into the ground E in order to improve the electric connection with the ground E.

Next, a description will be given of a lightning suppression action of the arrester 1 of the present embodiment configured as described above.

As illustrated in FIG. 1, when a thundercloud D in which a negative charge is distributed on a cloud base approaches, an opposite charge (positive charge) is distributed on a surface of the ground E, and a positive charge is collected on the first electrode body 2a grounded to the ground E.

Meanwhile, the second electrode body 2b opposed to the first electrode body 2a via the electrical insulating layer Z is negatively charged by an action of the capacitor.

Further, the jewel 3 electrically connected to the second electrode body 2b via the cable C is negatively charged as a whole.

Therefore, the jewel 3 forms a protection region by a negative charge on the top of the structure A, generation of an upward streamer in and around the structure A rarely occurs due to the negative charge of the protection region, and occurrence of lightning is suppressed.

Here, the quantity of negative charges stored in the jewel 3 depends on the capacity of the capacitor 2.

To sufficiently negatively charge the charged body B so that the charged body B is charged with necessary negative charges to cause the lightning suppression, the capacity of the capacitor 2 connected to the jewel 3 is increased.

Meanwhile, since the capacitor 2, which is a main component of the arrester 1 and is a heavy object, is installed on the ground E, an operation of installing the heavy object is concentrated on the ground.

As a result, the installation operation of the arrester 1 is simplified, and it is easy to cope with the increase in the size of the arrester 1 for improving the lightning suppression action.

In addition, since the charged body B forming the negative charge region for lightning suppression on the top of the structure A is lighter in weight than the capacitor 2 which is a main component, it is possible to reduce high-place work associated with installation of the arrester 1.

Meanwhile, as shown in the present embodiment, when the structure A is applied to the pagoda or the Buddhist temple, the jewel 3 provided on the top thereof can be used as the charged body B.

Therefore, the arrester 1 of the present embodiment can be installed using an existing construction, so that the installation operation can be further reduced and the installation cost can be reduced.

Figure 2:
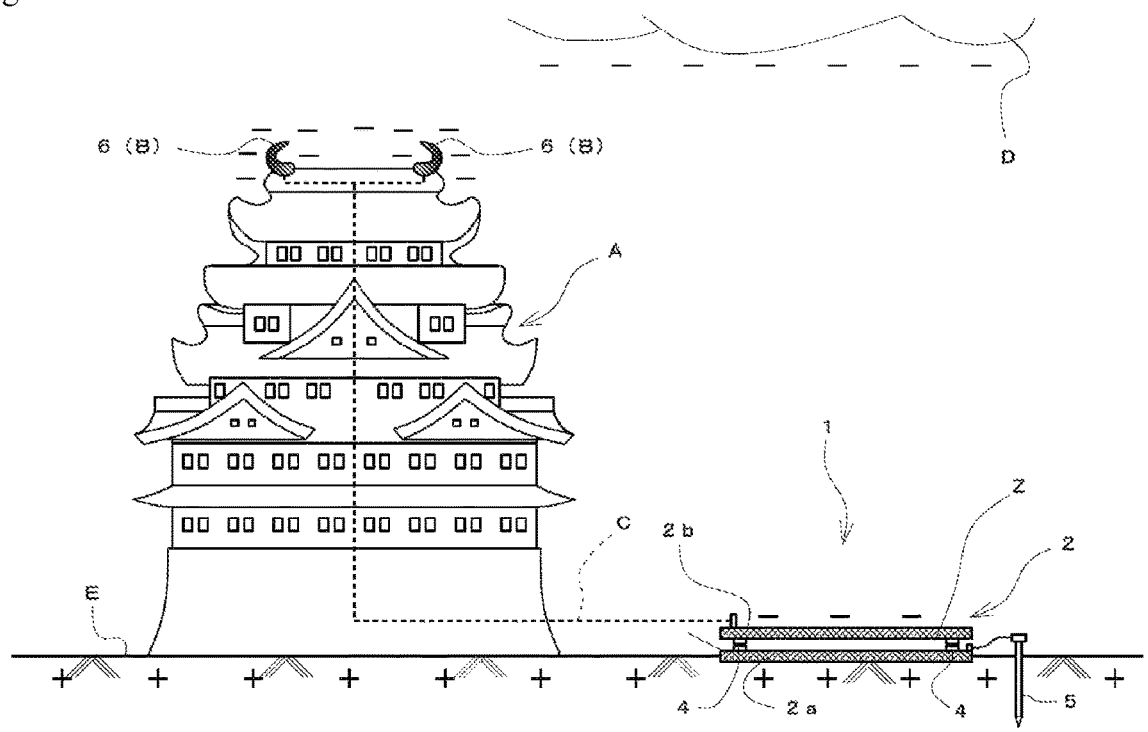
FIG. 2 is a front view schematically illustrating a second embodiment of the invention.

FIG. 2 illustrates a second embodiment of the invention.

In the present embodiment, the arrester 1 is applied to a castle tower corresponding to the existing structure A.

Further, a shachihoko 6 installed on the top of the castle tower is used as the charged body B.

In the present embodiment, the shachihoko 6 is negatively charged so that lighting on or around the castle tower can be suppressed by a similar action to that of the first embodiment described above.

In addition, it is possible to similarly ensure the effect of simplifying the installation operation of the arrester 1 of the present embodiment.

Figure 3:
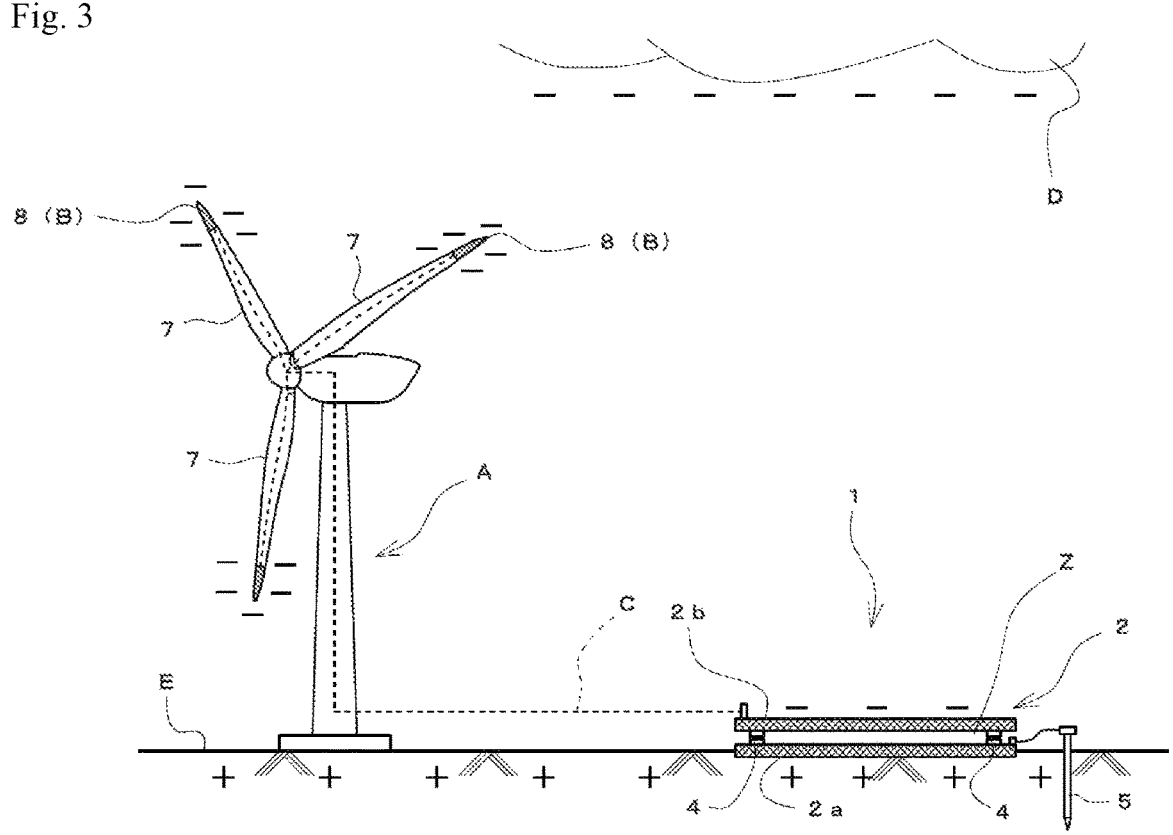
FIG. 3 is a front view schematically illustrating a third embodiment of the invention.

FIG. 3 illustrates a third embodiment of the invention.

In the present embodiment, the arrester 1 is applied to an existing windmill included in a wind power generator.

Further, a receptacle 8 provided at a tip of each blade of the windmill is used as the charged body B.

By rotation of the windmill, the tip of each blade 7 is moved to an upper part of the windmill to approach the thundercloud D described above.

Here, since a protection region by negative charges is formed at the tip of each blade 7 by the receptacle 8, lightning on each blade 7 can be suppressed.

In addition, in the present embodiment, the effects obtained in the first embodiment and second embodiment described above can be obtained in the same manner.

Figure 4:
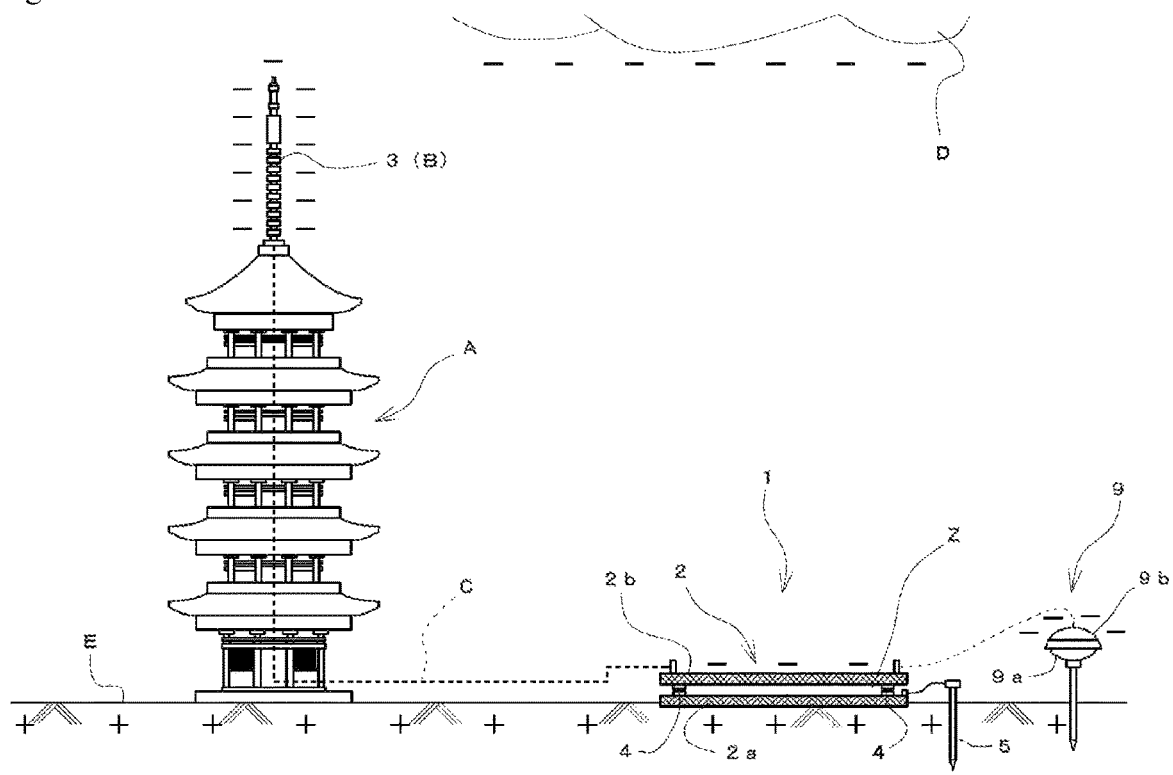
FIG. 4 is a front view schematically illustrating a fourth embodiment of the invention.

FIG. 4 illustrates a fourth embodiment of the invention.

In the present embodiment, a configuration is adopted in which a capacitor 9 having a smaller capacitance than that of the capacitor 2 is provided in addition to the capacitor 2 illustrated in each of the above-described embodiments.

The capacitor 9 includes a first electrode body 9*a* grounded to the ground E, and a second electrode body 9*b* opposed to the first electrode body 9*a* via the electrical insulating layer Z.

Further, the second electrode body 2*b* of the capacitor 2 and the second electrode body 9*b* of the capacitor 9 are electrically connected to each other.

By adopting such a configuration, when a lightning strike having more energy than expected occurs and lightning strikes the charged body B, the capacitor 9 having a small capacitance is short-circuited, so that energy of the lightning can be sent to the ground to prevent the structure A from being damaged.

Note that various shapes, dimensions, etc. of the respective components shown in the above embodiments are merely examples, and can be variously changed based on design requirements, etc.

For example, the configuration of the charged body B can be arbitrarily changed, and the charged body B can be formed by electrically insulating a Franklin rod installed as a lightning rod in a structure from the structure.

In addition, the configurations of the capacitors 2 and 9 can be changed as appropriate.

That is, capacitors having different capacities can be used alone or in combination, and the number of capacitors used can be appropriately selected.

In addition, even though a flat ground is exemplified as a grounding place of the capacitor 2, the invention is not limited thereto. For example, an installation location of the capacitor 2 may be grounded on a place higher than the surrounding ground or on a ground that is actively raised.

As described above, by raising a ground having a grounding place of the capacitor 2, the capacitor 2 can be protected from an influence of water, water damage, etc.

Note that as a method of raising the ground, it is possible to use an existing construction method using a concrete wall surrounding the periphery, a stone wall, a retaining wall, etc. in addition to an embankment.

In addition, it is possible to provide a wall for preventing flooding around the capacitor.

EXPLANATIONS OF LETTERS OR NUMERALS

1 (LIGHTNING SUPPRESSION TYPE) ARRESTER
2 CAPACITOR
2*a* FIRST ELECTRODE BODY
2*b* SECOND ELECTRODE BODY
3 JEWEL
4 INSULATOR
5 (GROUND) ROD
6 SHACHIHOKO
7 BLADE
8 RECEPTACLE
9 CAPACITOR
A STRUCTURE
B CHARGED BODY
C CABLE
D THUNDERCLOUD
E GROUND
Z ELECTRICAL INSULATING LAYER

The invention claimed is:

1. A lightning suppression type arrester for suppressing lightning on a structure, the lightning suppression type arrester comprising:
   a charged body made of a conductive material provided on the top of the structure and electrically insulated from the structure;
   a capacitor electrically connected to the charged body;
   wherein the capacitor including: a first electrode body being installed on a ground and electrically connected to the ground; a second electrode body opposed to the first electrode body via an electrical insulating layer to store an electric charge by a capacitance between the first electrode body and the second electrode body;
   wherein the second electrode body is electrically connected to the charged body.

2. The lightning suppression type arrester according to claim 1, wherein the structure corresponds to a pagoda or a Buddhist temple, and the charged body corresponds to a jewel provided on a top of the pagoda or the Buddhist temple.

3. The lightning suppression type arrester according to claim 2, wherein an installation location of the capacitor is higher than a surrounding ground.

4. The lightning suppression type arrester according to claim 2, wherein a plurality of capacitors is provided.

5. The lightning suppression type arrester according to claim 1, wherein the structure corresponds to a castle tower, and the charged body corresponds to a shachihoko provided on a top of the castle tower.

6. The lightning suppression type arrester according to claim 5, wherein an installation location of the capacitor is higher than a surrounding ground.

7. The lightning suppression type arrester according to claim 5, wherein a plurality of capacitors is provided.

8. The lightning suppression type arrester according to claim 1, wherein the structure corresponds to a windmill, and the charged body corresponds to a receptacle provided at a blade tip of the windmill.

9. The lightning suppression type arrester according to claim 8, wherein a plurality of capacitors is provided.

10. The lightning suppression type arrester according to claim 1, wherein the structure corresponds to a building or a house, and the charged body corresponds to a lightning rod provided in the building or the house.

11. The lightning suppression type arrester according to claim 8, wherein an installation location of the capacitor is higher than a surrounding ground.

12. The lightning suppression type arrester according to claim 10, wherein an installation location of the capacitor is higher than a surrounding ground.

13. The lightning suppression type arrester according to claim 10, wherein a plurality of capacitors is provided.

14. The lightning suppression type arrester according to claim 13, wherein the plurality of capacitors comprises a first capacitor having a large capacitance and a second capacitor having a small capacitance.

15. The lightning suppression type arrester according to claim 14, wherein an installation location of the capacitor is higher than a surrounding ground.

16. The lightning suppression type arrester according to claim 1, wherein a plurality of capacitors is provided.

17. The lightning suppression type arrester according to claim 16, wherein the plurality of capacitors comprises a first capacitor having a large capacitance and a second capacitor having a small capacitance.

18. The lightning suppression type arrester according to claim 17, wherein an installation location of the capacitor is higher than a surrounding ground.

19. The lightning suppression type arrester according to claim 16, wherein an installation location of the capacitor is higher than a surrounding ground.

20. The lightning suppression type arrester according to claim 1, wherein an installation location of the capacitor is higher than a surrounding ground.

* * * * *